United States Patent
Brothers (10) Patent No.: US 8,712,040 B2
(45) Date of Patent: Apr. 29, 2014

(54) DATA-CONDITIONED ENCRYPTION METHOD

(76) Inventor: Harlan J. Brothers, East Haven, CT (US)

( * ) Notice: Subject to any disclaimer, the term of this patent is extended or adjusted under 35 U.S.C. 154(b) by 256 days.

(21) Appl. No.: 13/012,534

(22) Filed: Jan. 24, 2011

(65) Prior Publication Data

US 2011/0194687 A1 Aug. 11, 2011

Related U.S. Application Data

(60) Provisional application No. 61/297,722, filed on Jan. 22, 2010.

(51) Int. Cl.
*H04L 9/00* (2006.01)

(52) U.S. Cl.
USPC .................. 380/44; 713/150; 380/37; 380/46

(58) Field of Classification Search
CPC ............ G06F 9/30156; G06F 9/30178; H04L 1/0057; H04L 9/06; H04L 9/0662; H04L 9/0894
USPC .......................................................... 380/44
See application file for complete search history.

(56) References Cited

U.S. PATENT DOCUMENTS

| | | | |
|---|---|---|---|
| 4,146,046 A | 3/1979 | Dobras | |
| 4,386,233 A | 5/1983 | Smid et al. | |
| 4,516,246 A | 5/1985 | Kenemuth | |
| 5,054,067 A | 10/1991 | Moroney et al. | |
| 5,285,497 A | 2/1994 | Thatcher, Jr. | |
| 5,533,128 A | 7/1996 | Vobach | |
| 5,686,715 A | 11/1997 | Watanabe et al. | |
| 5,727,062 A | 3/1998 | Ritter | |
| 5,838,796 A | 11/1998 | Mittenthal | |
| 5,902,929 A | 5/1999 | Okamoto et al. | |
| 6,052,786 A | 4/2000 | Tsuchida | |
| 6,097,812 A | 8/2000 | Friedman | |
| 6,182,216 B1 | 1/2001 | Luyster | |
| 6,269,164 B1 | 7/2001 | Pires | |
| 6,295,093 B1 | 9/2001 | Park et al. | |
| 6,459,792 B2 * | 10/2002 | Ohmori et al. | 380/37 |
| 6,507,678 B2 | 1/2003 | Yahagi | |
| 6,553,516 B1 * | 4/2003 | Suda et al. | 714/702 |
| 6,804,355 B1 | 10/2004 | Graunke | |
| 6,909,783 B2 | 6/2005 | Incarnato et al. | |
| 6,934,388 B1 | 8/2005 | Clark | |
| 7,006,629 B2 | 2/2006 | Murray | |
| 7,026,964 B2 * | 4/2006 | Baldwin et al. | 341/87 |
| 7,313,235 B2 | 12/2007 | Liang | |
| 7,529,365 B2 | 5/2009 | Liang | |
| 7,707,431 B2 | 4/2010 | Liang | |
| 7,711,549 B2 | 5/2010 | Feinberg et al. | |
| 2006/0153382 A1* | 7/2006 | Mai | 380/251 |
| 2006/0291650 A1* | 12/2006 | Ananth | 380/46 |
| 2007/0098179 A1* | 5/2007 | Nave | 380/286 |
| 2008/0301431 A1* | 12/2008 | Hea | 713/150 |
| 2009/0045988 A1* | 2/2009 | Lablans | 341/57 |
| 2009/0132746 A1* | 5/2009 | Tom | 710/300 |

* cited by examiner

*Primary Examiner* — Andrew Nalven
*Assistant Examiner* — Mohammed Waliullah
(74) *Attorney, Agent, or Firm* — Ostrolenk Faber LLP (57) ABSTRACT

A system and method for encryption of data is disclosed. At least one block of the data is received. The at least one block of data is modified to cause each unique data element within the at least one block to appear with a respective predetermined frequency ratio. The block of data is encrypted into ciphertext based at least on an encryption key.

21 Claims, 3 Drawing Sheets

DATA-CONDITIONED ENCRYPTION METHOD

RELATED APPLICATION

This application is based on and claims priority to U.S. Provisional Patent Application Ser. No. 61/297,722, filed on Jan. 22, 2010 and entitled GRANULAR PERMUTATION CIPHER, the entire contents of which are hereby incorporated by reference.

BACKGROUND

1. Field

The present application relates, generally, to data encryption and, more particularly, to conditioning of data to be substantially immune to frequency analysis.

2. Description of the Prior Art

In an age that depends on the private exchange of sensitive information, it is critical to have encryption methods that are fundamentally secure and relatively easy to implement. Such methods should also be reasonably immune from ever-increasing computational power; brute force and nuanced cryptanalysis have become relatively easy to apply. To combat these and other attacks, the key lengths have become longer, and encryption/decryption algorithms have become significantly more complicated.

Encryption methods date back to at least the time of the ancient Greeks, and now take a multitude of forms. The most robust modern approaches (e.g., Advanced Encryption Standard and Triple Data Encryption Standard) increase effectiveness by combining basic methods, often including cryptographic primitives such as hash functions and cryptographically secure pseudorandom number generators (CSPRNGs), into cryptographic systems. Indeed, given the often complicated combinations of techniques and operations comprising modern ciphers, it is sometimes difficult to categorize methods that combine fundamental algorithmic concepts, such as those underlying block ciphers, stream ciphers, substitution, transposition, and permutation ciphers.

It is generally accepted that there is an inverse relation between what is secure in a provable sense and what is secure from a practical standpoint. It is, therefore, a common goal in cryptography to find methods that can rigorously demonstrate security, while at the same time being practical to implement. It is also critical that such methods not rely on algorithmic secrecy, but rather remain open to inspection and evaluation.

SUMMARY

Accordingly, a system and method are provided for data encryption. In an embodiment, at least one computing device has instructions that, when executed, cause the at least one computing device to receive at least one block of the data, modify the at least one block of data to cause each unique data element within the at least one block to appear with a respective predetermined frequency ratio, and to encrypt the block of data into ciphertext based at least on an encryption key.

In one or more embodiments, the at least one computing device may generate the encryption key or may receive the encryption key. Further, the encryption key may be generated based at least on a key exchange algorithm.

Moreover, the at least one computing device may be configured to decrypt at least one other block of ciphertext and modify the decrypted ciphertext so that each unique data element of the decrypted ciphertext appears in the unique data element's ratio prior to being modified with a respective predetermined frequency ratio.

In one or more embodiments, the at least one block of data comprises a plurality of blocks of data, and further wherein the encryption key is different for at least one of the plurality of blocks of data. Further, in one or more embodiments, the at least one computing device has instructions that, when executed, cause the at least one computing device to derive the different encryption key from a respective one of the plurality of blocks of data.

In one or more embodiments, the at least one computing device further receives instructions that, when executed, cause the at least one computing device to modify a character code associated with the data, wherein the respective predetermined frequency ratio is achieved by at least using the modified character code. The at least one computing device may have further instructions that, when executed, cause the at least one computing device to receive the modified character code. Moreover, the modified character code may include a plurality of characters that contain a substantially same distribution of elements.

In another embodiment, a system and method for encrypting data is provided that includes constructing at least one character code to cause each character in the at least one character code to have substantially a same distribution of elements. Further, the at least one character code is stored on at least one computing device, and the data are encoded with the stored at least one character code. Moreover, the encoded data are encrypted into ciphertext by the at least one computing device, based at least on one encryption key.

Other features and advantages of the present application will become apparent from the following description, which refers to the accompanying drawings.

BRIEF DESCRIPTION OF THE DRAWINGS

For the purpose of illustration, there is shown in the drawings an embodiment which is presently preferred; it being understood, however, that the teachings herein are not limited to the precise arrangements and instrumentalities shown.

DETAILED DESCRIPTION OF THE PREFERRED EMBODIMENT

The present application regards conditioning data to provide encryption methods that are substantially impervious to cryptanalytic attack, such as via frequency analysis.

Figure 1:
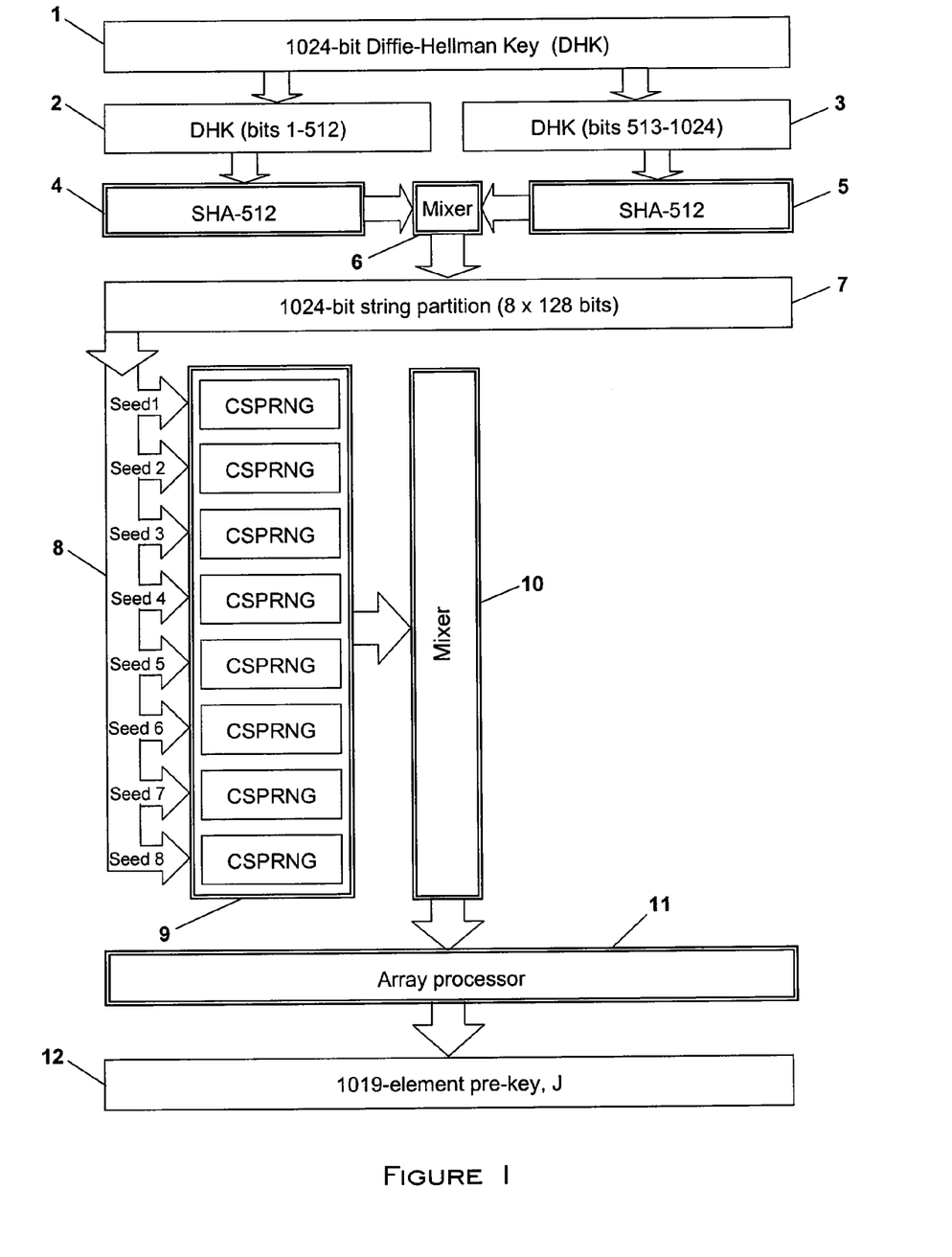
FIG. 1 is a block diagram showing the generation of a pre-key.

Referring to FIG. 1, an example method for encrypting data in accordance with the present application is described. A suitable key exchange algorithm, such as Diffie-Hellman or ElGamal, is used to establish common key 1, which may be, for example, a 1024-bit common key for communication, referred to herein, generally, as "DHK." In one or more embodiments, more than one DHK can be used per message. Key 1 is split into two halves (2 and 3) each of which is hashed using a Secure Hash Algorithm, such as SHA-512, SHA 4 and SHA 5 respectively. The hashes are then interleaved in mixer 6 such that each successive eight bits of SHA 4 are followed by the respective successive eight bits of SHA 5. The interleaving process produces a 1024-bit string 7, which is then partitioned into eight 128-bit seed values 8. Each seed value may be used to initialize a cryptographically strong pseudorandom number generator ("CSPRNG") module 9.

Although the example shown in and described with reference to FIG. 1 regards use of eight independent CSPRNGs (or pseudo random number generators ("PRNGs") in general), many other possible encryption methods for producing pseudorandom sequences are envisioned and supported by the teachings herein. The actual choice of PRNG may depend, for example, on the specific application, platform, and environment in which the encryption takes place. For example, a single CSPRNG may be used to generate all eight pseudorandom streams. Alternatively, multiple PRNGs of different designs may be employed.

In an embodiment, eight pseudorandom streams are generated, each being composed of 128 32-bit numbers, which may be integers or decimals.

Continuing with reference to FIG. 1, the eight pseudorandom streams from CSPRNG 9 are interleaved in mixer 10 such that each successive 32 bits, $d_i$, of the first stream are followed by the respective successive 32 bits of the second stream, of the third stream, and so on through to the eighth stream. Thereafter, five elements, $d_j$, are removed from this 1024-element array, L, by array processor 11. The removal may be accomplished in numerous suitable ways. In an embodiment that is based on an integer stream and beginning with $d_1$, array processor 11 evaluates $d_j$ (Mod 1024)+1 until five unique position pointers are found. Thereafter, the elements occupying the indicated positions are removed.

In an alternate embodiment, the CSPRNG 9 simply outputs 1019 32-bit values, so that no elements require removal.

To ensure a bijective encryption function (one with a unique inverse), the resulting 1019-element random array is then indexed from 1 to 1019 by array processor 11 to produce array, T:

$$T=\{\{1,d_1\},\{2,d_2\},\ldots,\{1019,d_{1019}\}\}.$$

Thereafter, T is sorted on $d_i$ and only the resulting sequence of indices are extracted. This yields an unpredictable and unknowable sequence of 1019 unique position pointers. This sequence is referred to herein, generally, as the pre-key, J 12.

If the CSPRNG 9 is properly implemented and has not been compromised by an adversary, the non-linearity of the hash function ensures that, without knowing the exact value of DHK 1, it is highly unlikely that specific knowledge of J 12 will be determined.

It is envisioned herein that the generation of J 12 is not limited to the precise methods or techniques with respect to the use of cryptographic primitives, described above. Many suitable alternative combinations and configurations are useable in accordance with the teachings herein. For example, J 12 may be generated using a Knuth-type shuffle or a hardware-based source of entropy and thereafter directly shared using a secure channel.

Although J 12 may be used to directly shuffle blocks of data, it is possible to incorporate more than one shuffle algorithm. If the block and pre-key lengths are a prime number, then the sequence of position pointers may be autoshuffled in a bijective fashion. As used herein, the term, autoshuffle, refers generally to an algorithm that rearranges the order of a sequence in a non-linear manner and based on the content and number-theoretic characteristics of the sequence itself. Moreover, the encryption method described herein is also suitable for use with non-prime block and pre-key lengths. In cases of non-prime lengths, however, having fewer elements whose values are coprime to the sequence length is not as efficient and requires greater care in implementation. Depending on the specific design of the CSPRNG 9, autoshuffling J 12 helps to erase any statistical properties that might yield useful information, such as in a cryptanalytic attack.

Figure 2:
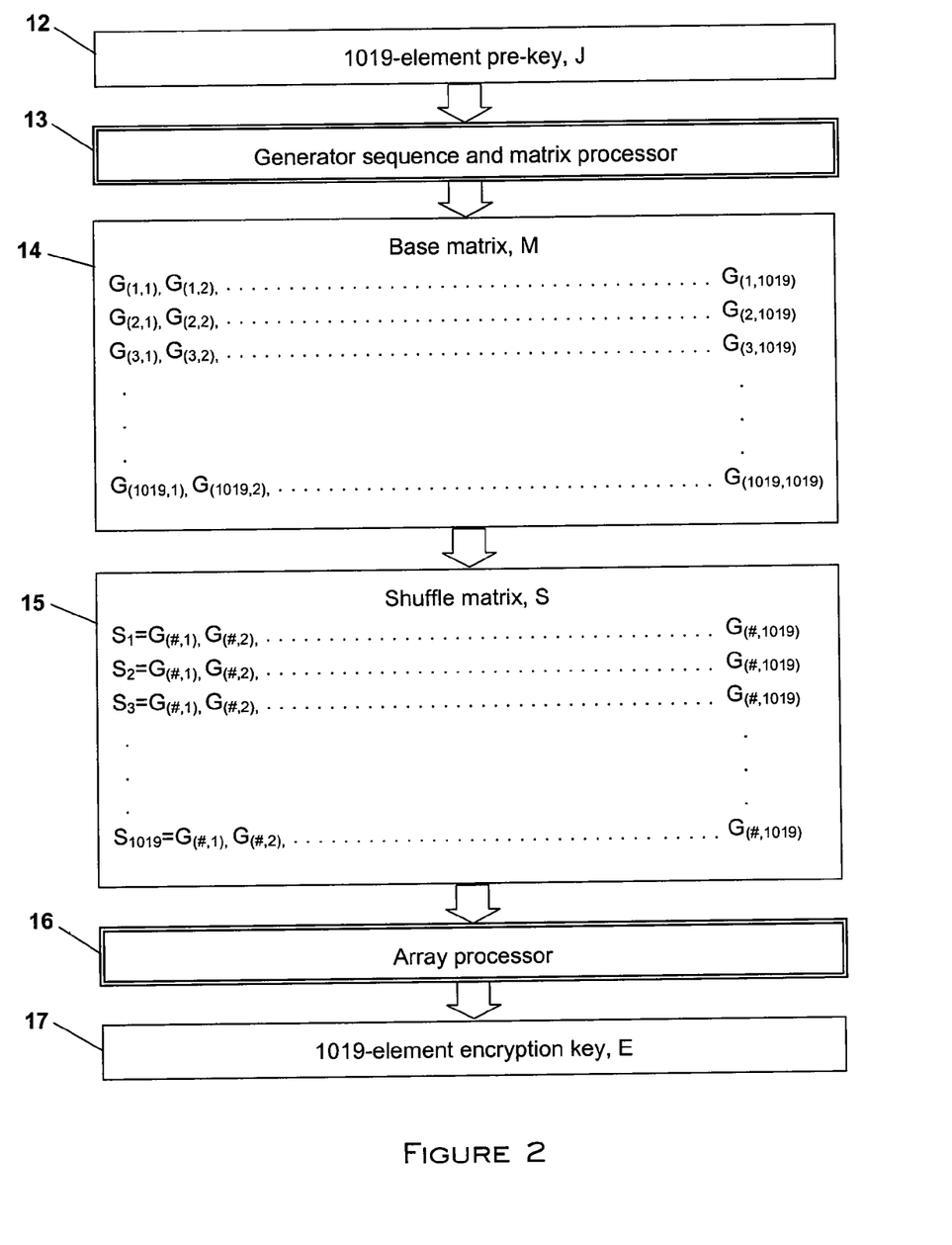
FIG. 2 is a block diagram showing an example of an auto-shuffle algorithm that operates on the pre-key and outputs an encryption key.

FIG. 2 illustrates an example method for autoshuffling a key of prime length, $\lambda$. To start, generator sequence and matrix processor 13 constructs generator sequence $G_1$ using an offset value $\epsilon$ derived from J 12. To minimize any correlation between the input and output of the autoshuffle method, $\epsilon$ is preferably not equal to 1, $(\lambda+1)/2$, $\lambda-1$, or $\lambda$ itself. While there are many effective ways to choose a random value for $\epsilon$, the value in position 1 of J 12 (i.e., $J_1$) may used as a pointer to locate the $J_1^{th}$ element of J, though the value in any position, not just position 1, may be used. For example, using an 11 element array a={4, 7, 1, 8, 9, 3, 11, 6, 5, 10, 2}, the first element $a_1$=4. Element 4 ($a_4$) sets the value of $\epsilon$ equal to eight ($\epsilon$=8).

If the $J_1^{th}$ element is equal to 1, 510, 1018, or 1019, then the $J_1^{th}$ element is preferably used in lieu thereof. This process of examining subsequent elements may be repeated, as necessary, in order to establish a value for $\epsilon$ that is not equal to 1, 510, 1018, or 1019.

To construct $G_1$, generator sequence and matrix processor 13 preferably begins with the number "1." Successive elements are obtained by adding $\epsilon$ to the current value and taking the result modulo 1019. For example, with $\epsilon$=273, $$G_1=\{1,274,547,820,74,347,620,893,147,420,693,\ldots,747\}.$$

Finally, the value "0" is replaced with the value "1019."

Next, a base matrix M 14 is preferably generated by setting the first row to $G_1$. Each successive row $G_i$ rotates the previous row one position to the left. Thus, for the present example, $$G_2=\{274,547,820,74,347,620,893,147,420,693,966,\ldots,1\}.$$

The last row $G_{1019}$ is equivalent to $G_1$ rotated 1018 positions to the left, or in this example:

$$G_{1019}=\{747,1,274,547,820,74,347,620,893,147,420,\ldots,474\}.$$

Continuing with reference to FIG. 2, shuffle matrix S 15 is then obtained by sorting the rows of base matrix M 14 on J 12. The hash mark "#" in the subscript of the rows $S_i$ of shuffle matrix S 15 indicates that the row position of each $G_{(i,j)}$ is not fixed. Instead, the row position of each $G_{(i,j)}$ from base matrix M 14 is determined by the process of transposing {J, M}, sorting the 1019 resulting pairs of the form {Integer, Array} on the integer part, and extracting only the sequence of arrays.

Array processor 16 operates to shuffle J 12 using the rows of S 15 as follows. First, array processor 16 shuffles J using $S_1$ (row 1 of S), and then shuffles the output of this operation on $S_2$. Array processor 16 continues to shuffle each output on the following row, $S_{i+1}$. After 1019 shuffle operations, the final output is encryption key E 17, which is an unpredictable and unknowable sequence of 1019 position pointers with standard statistical measures and fixed point distribution that are substantially indistinguishable from those of a true random permutation of 1019 elements.

Although the example method shown in and described with reference to FIG. 2 includes the use of blocks (and respective keys) of length 1019, one skilled in the art will recognize that other lengths are supported. Prime lengths are useful specifically when implementing the preferred autoshuffle method described herein. Smaller blocks reduce both the length the encryption key and the bit length of its constituent elements. Moreover, it is not necessary to use blocks having a fixed size. For example, use of a "safe prime" (e.g., 1019) makes it trivial to employ a combination of block sizes of 1019 and 509 (i.e., a Sophie Germain prime) in which the size is determined either by the parity of the sequence of elements in J 12 or by the length of the data to be encrypted. It may further be desirable to adjust the size of blocks specifically to best match the length of the data to be encrypted.

Continuing with reference to the example method in FIG. 2, E 17 is used to shuffle data that has been frequency-conditioned for encryption. The purpose of conditioning the data in this manner is to render the data substantially immune to a cryptanalytic attack that uses frequency analysis. By ensuring that each unique data element appears with a predetermined frequency ratio, the data are frequency-conditioned. In an example embodiment, given k unique elements, the ratio of the appearance of each k is set to substantially equal 1/k. Thus, for binary data in a permutation-based block cipher, the predetermined frequency ratios for the symbols "1" and "0" are 50% for each. If k is not a factor of the block length, the actual ratios may differ slightly from the ideal predetermined frequency ratios over the length of a block. In a preferred embodiment, the length of the conditioned data to be encrypted is a multiple of k.

In accordance with the teachings herein, two basic methods for conditioning blocks of plaintext or data, herein referred to as "P" (19 FIG. 3), are envisioned.

In an embodiment, frequency-conditioning is accomplished by a form of coding referred to herein, generally, as parity adjusted character code (PACC). As described in greater detail below, and with reference to Table 1A, Table 1B, and Table 2, a PACC is particularly useful to deter a frequency analysis attack.

Table 1A shows Example 1 of a Parity Adjusted Character Code. Table 1B shows a mapping of extended characters for Example 1 of a Parity Adjusted Character Code. Table 2 shows Example 2 of a Parity Adjusted Character Code.

Referring now to Table 1A and Table 1B, below, one example of PACC is provided. The foundation of PACC is relatively simple and can be implemented in a variety of different ways. PACC may be adapted to any language, including as set forth in Table 1, English. As with ASCII, each character is encoded by one byte of information (a Unicode-style, 16-bit format or, alternatively, a custom length format may be employed). For example, given was the ordered set of values for one byte, $$w=\{b_1, b_2, \ldots b_8\}, \text{ for } b_i \in \{0,1\}.$$

Thereafter, all upper and lower case letters, all numbers, and the most common punctuation are assigned to the 8-bit numbers represented by w for which $$\sum_{i=1}^{8} b_i = 4.$$

There are 70 ($_8C_4$) of these values. The 27 other printable ASCII characters may be carefully be assigned by dividing them between the two groups for which $$\sum_{i=1}^{8} b_i = 3 \text{ and } \sum_{i=1}^{8} b_i = 5.$$

For example, if the code for the left bracket symbol "[" contains a combination of 3 ones and 5 zeros, the code for the right bracket symbol "]" would contain a combination of 5 ones and 3 zeros. Because these symbols are most often used in pairs, this approach helps to preserve parity in a given block of data.

TABLE 1A

Bit Sum = 4        (Total: 70)

| Char | Binary | Dec |
|------|--------|-----|
| space | 00001111 | 15 |
| ! | 00010111 | 23 |
| " | 00011011 | 27 |
| ' | 00011101 | 29 |
| , | 00011110 | 30 |
| - | 00100111 | 39 |
| . | 00101011 | 43 |
| 0 | 00101101 | 45 |
| 1 | 00101110 | 46 |
| 2 | 00110011 | 51 |
| 3 | 00110101 | 53 |
| 4 | 00110110 | 54 |
| 5 | 00111001 | 57 |
| 6 | 00111010 | 58 |
| 7 | 00111100 | 60 |
| 8 | 01000111 | 71 |
| 9 | 01001011 | 75 |
| ? | 01001101 | 77 |
| A | 01001110 | 78 |
| B | 01010011 | 83 |
| C | 01010101 | 85 |
| D | 01010110 | 86 |
| E | 01011001 | 89 |
| F | 01011010 | 90 |
| G | 01011100 | 92 |
| H | 01100011 | 99 |
| I | 01100101 | 101 |
| J | 01100110 | 102 |
| K | 01101001 | 105 |
| L | 01101010 | 106 |
| M | 01101100 | 108 |
| N | 01110001 | 113 |
| O | 01110010 | 114 |
| P | 01110100 | 116 |
| Q | 01111000 | 120 |
| R | 10000111 | 135 |
| S | 10001011 | 139 |
| T | 10001101 | 141 |
| U | 10001110 | 142 |
| V | 10010011 | 147 |
| W | 10010101 | 149 |
| X | 10010110 | 150 |
| Y | 10011001 | 153 |
| Z | 10011010 | 154 |
| a | 10011100 | 156 |
| b | 10100011 | 163 |
| c | 10100101 | 165 |
| d | 10100110 | 166 |
| e | 10101001 | 169 |
| f | 10101010 | 170 |
| g | 10101100 | 172 |
| h | 10110001 | 177 |
| i | 10110010 | 178 |
| j | 10110100 | 180 |
| k | 10111000 | 184 |
| l | 11000011 | 195 |
| m | 11000101 | 197 |
| n | 11000110 | 198 |
| o | 11001001 | 201 |
| p | 11001010 | 202 |
| q | 11001100 | 204 |
| r | 11010001 | 209 |
| s | 11010010 | 210 |
| t | 11010100 | 212 |
| u | 11011000 | 216 |
| v | 11100001 | 225 |
| w | 11100010 | 226 |
| x | 11100100 | 228 |
| y | 11101000 | 232 |
| z | 11110000 | 240 |

TABLE 1B

| Char | Binary | Dec |
|---|---|---|
| Bit Sum = 3 | (Total: 14) | |
| LF | 00000111 | 7 |
| ( | 00001011 | 11 |
| < | 00001101 | 13 |
| [ | 00001110 | 14 |
| { | 00010011 | 19 |
| # | 00010101 | 21 |
| $ | 00010110 | 22 |
| & | 00011001 | 25 |
| * | 00011010 | 26 |
| + | 00011100 | 28 |
| / | 00100011 | 35 |
| : | 00100101 | 37 |
| \| | 00100110 | 38 |
| ~ | 00101001 | 41 |
| Bit Sum = 5 | (Total: 13) | |
| CR | 11111000 | 248 |
| ) | 11110100 | 244 |
| > | 11110010 | 242 |
| ] | 11110001 | 241 |
| } | 11101100 | 236 |
| % | 11101010 | 234 |
| ; | 11101001 | 233 |
| = | 11100110 | 230 |
| @ | 11100101 | 229 |
| \ | 11100011 | 227 |
| ^ | 11011100 | 220 |
| _ | 11011010 | 218 |
| ` | 11011001 | 217 |

Tables 1A and 1B show a sample character mapping for the common English symbols. Of course, many other mapping schemes are supported by the present application, any of which can be designed and chosen, for example, to maximize encoding efficiency for a given computing environment and language.

Table 2, below, shows an alternative and more robust mapping that includes one byte for converting lowercase to uppercase, and a second byte for mapping to an alternate character set. Here, the CAP byte is used to convert lowercase letters to uppercase. Upon decoding, the conversion effectively subtracts 32 from the subsequent ASCII character code, thereby converting the lower case letter to a capital letter. The ALT byte indicates that the subsequent byte(s) or block(s) are to be mapped using a different, predetermined and possibly custom character set. Indeed, using this scheme, the ALT byte may be employed to indicate the use of a different permutation of charter-to-code mappings within the current PACC system.

TABLE 2

| Char | Binary | Dec |
|---|---|---|
| Bit Sum = 4 | (Total: 70) | |
| a | 00001111 | 15 |
| b | 00010111 | 23 |
| c | 00011011 | 27 |
| d | 00011101 | 29 |
| e | 00011110 | 30 |
| f | 00100111 | 39 |
| g | 00101011 | 43 |
| h | 00101101 | 45 |
| i | 00101110 | 46 |
| j | 00110011 | 51 |
| k | 00110101 | 53 |
| l | 00110110 | 54 |
| m | 00111001 | 57 |
| n | 00111010 | 58 |
| o | 00111100 | 60 |

TABLE 2-continued

| Char | Binary | Dec |
|---|---|---|
| Bit Sum = 4 | (Total: 70) | |
| p | 01000111 | 71 |
| q | 01001011 | 75 |
| r | 01001101 | 77 |
| s | 01001110 | 78 |
| t | 01010011 | 83 |
| u | 01010101 | 85 |
| v | 01010110 | 86 |
| w | 01011001 | 89 |
| x | 01011010 | 90 |
| y | 01011100 | 92 |
| z | 01100011 | 99 |
| 0 | 01100101 | 101 |
| 1 | 01100110 | 102 |
| 2 | 01101001 | 105 |
| 3 | 01101010 | 106 |
| 4 | 01101100 | 108 |
| 5 | 01110001 | 113 |
| 6 | 01110010 | 114 |
| 7 | 01110100 | 116 |
| 8 | 01111000 | 120 |
| 9 | 10000111 | 135 |
| space | 10001011 | 139 |
| ! | 10001101 | 141 |
| " | 10001110 | 142 |
| # | 10010011 | 147 |
| $ | 10010101 | 149 |
| % | 10010110 | 150 |
| & | 10011001 | 153 |
| ' | 10011010 | 154 |
| ( | 10011100 | 156 |
| ) | 10100011 | 163 |
| * | 10100101 | 165 |
| + | 10100110 | 166 |
| , | 10101001 | 169 |
| - | 10101010 | 170 |
| . | 10101100 | 172 |
| / | 10110001 | 177 |
| : | 10110010 | 178 |
| ; | 10110100 | 180 |
| < | 10111000 | 184 |
| = | 11000011 | 195 |
| > | 11000101 | 197 |
| ? | 11000110 | 198 |
| @ | 11001001 | 201 |
| [ | 11001010 | 202 |
| \ | 11001100 | 204 |
| ] | 11010001 | 209 |
| { | 11010010 | 210 |
| \| | 11010100 | 212 |
| } | 11011000 | 216 |
| ~ | 11100001 | 225 |
| LF | 11100010 | 226 |
| CR | 11100100 | 228 |
| CAP | 11101000 | 232 |
| ALT | 11110000 | 240 |

By extension and in an alternate embodiment, any block can specify the precise permutation of charter-to-code mappings to be used within the established PACC. This may take many forms such as:

1) an explicit assignment list;
2) an explicit permutation list;
3) a seed value to be used in conjunction with a CSPRNG for rearranging the assignments using, for example, a Knuth-type shuffle; or
4) a precoded instruction sequence for how to reassign the charter-to-code mappings for a given section of the plaintext (e.g., parameters for performing an autoshuffle).

For example, using only the first 5 entries in Table 2,
a=00001111
b=00010111
c=00011011 d=00011101
e=00011110 in an embodiment using an explicit assignment list, the first block of plaintext might begin

{0001110100011110000101110000111100011011} indicating that the following charter-to-code assignments are being used:

a=00011101
b=00011110
c=00010111
d=00001111
e=00011011.

In the specific case of a binary-based PACC using an odd-length code, there cannot be a precisely equal distribution of elements. For example, a 9-bit code contains either 5 ones and 4 zeros, or 4 ones and 5 zeros. Codes comprising a PACC contain the substantially same distribution of elements.

Thus, and in accordance with an embodiment that uses this method, any alphanumeric character may be transformed into any other character by a simple permutation rule. Encrypting frequency-conditioned data in conjunction with the block permutation cipher, substantially as described above, is equivalently secure to the known and provably secure one-time pad method. Unlike the one-time pad which requires the key to be a random string, the key employed according to the teaching herein is a random permutation. Similar to the case of a one-time pad, if the key is a truly random permutation, then, theoretically, any given ciphertext can be deciphered into any plaintext message of the same length.

By extension, any word or message can be transformed into any other word or message of the same length, simply by rearranging its constituent ones and zeros. For example, the following two messages are both 18 characters (144 bits) in length (including spaces and punctuation):

Message 1: "Attack immediately"
Message 2: "Quick, run away!!!"

Using the PACC shown in Table 1, 72 of the constituent bits for each message are ones and the other 72 are zeros. Either message can be bitwise rearranged and thereby transformed into the other. There are $(72!)^2$, or approximately $3.7 \times 10^{207}$ different ways to map Message 1 to Message 2. Moreover, any 144-bit long ciphertext can be decrypted into either message depending on what key is chosen by a potential adversary.

Other base representations other than base 2 may be used in accordance with the teachings herein. Ensuring all digits (or symbols) appear with substantially equal frequency, any such frequency conditioning technique can be employed in a manner consistent with the present application.

Moreover and in an alternative embodiment, character processing methods other than PACC may be used in accordance with the teachings herein. For example, a compression algorithm (e.g., gzip) may be used on plaintext prior to encryption. In this case, the compressed file may be padded to achieve parity, as discussed below.

A block length of 1019 bits can accommodate 1016 bits of 8-bit PACC encoded plaintext or up to 1019-bits of a general purpose parity-balanced ASCII or compressed file. Thus, when employing 8-bit PACC, 508 of the bits should be configured in each block to be ones.

Figure 3:
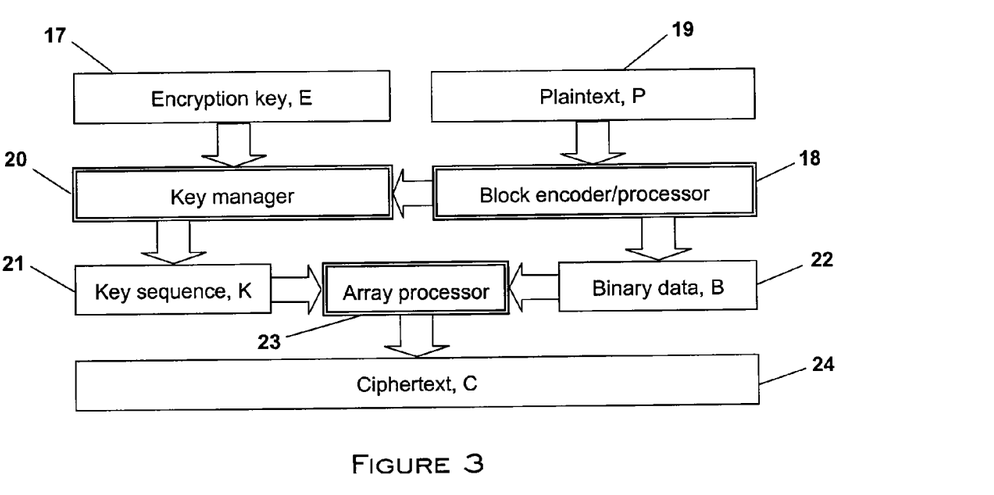
FIG. 3 illustrates the encryption of data.

Referring now to FIG. 3, block encoder/processor 18 serves to convert P 19 into PACC and appropriately pads blocks by employing the following method. In the case of blocks having variable lengths, block encoder/processor 18 also serves to partition P 19, appropriate to the specific implementation.

If plaintext message P 19 contains a fully frequency-balanced encoding (e.g., the 70 primary PACC characters from Tables 1A and 1B, or the PACC encoding shown in Table 2), P 19 need only be padded to a multiple of 1016 bits using an equal number of ones and zeros (or $\lfloor 1019/n \rfloor$ bits for an n-bit PACC, where "$\lfloor \ \rfloor$" denotes the Floor function).

In cases where the plaintext message or file P 19 does not have a monobit frequency of ½ (e.g., ASCII or compressed formats), the length to which the message is to be padded to achieve parity is calculated. This value is referred to herein, generally, as the parity point, $\overline{\omega}$. When using 1018 bits of data and 1 bit of padding, once $\overline{\omega}$ is calculated and if $\overline{\omega}<1018$, the data block is to padded to length $\overline{\omega}$ accordingly (with ones or zeros). Denoting the number of ones in a binary sequence by $N_1$ and the number of zeros by $N_0$, the remainder, r (where $r=1018-\overline{\omega}$), of the data block will be filled such that $N_1=N_0=r/2$.

If $\overline{\omega}>$1018, block encoder/processor 18 calculates $|N_1-N_0|$ at each bit $b_i$ in binary representation of plaintext P 19 to determine the value of i for which $|N_1-N_0|+i=1018$. In other words, this value indicates the bit for which the current count difference, when added to the current bit index exactly fills a 1018-bit data block. Thus, the number of frequency-conditioned plaintext bits that will appear in the first 1018 bits is given by i. The remainder r of the data block is then padded to parity.

For example, for the 12-bit data block p={10101110110} that contains 7 ones and 5 zeros, $\overline{\omega}=$10, the bit at which there are 6 ones and 4 zeros. Here, at this point in the block, $|6-4|+10=12$. The frequency-conditioned data block thus becomes {100101110100} with 6 ones and 6 zeros, and the last two data bits of p, {10} are carried to the start of the subsequent block.

The same process of determining $\overline{\omega}$ and then padding accordingly is applied to the subsequent bits in the plaintext, thereby generating as many frequency-conditioned blocks as required to represent the full message or file as a binary sequence with a monobit frequency of ½. Depending on the specific implementation, it may be appropriate to prepend each block with a header that encodes the parity point. In this case, the header can be encrypted by an XOR with a random string derived from the key establishment process (e.g., 1, 4, 9, 12). The header only has useful informational value after the ciphertext has been decoded.

When using 8-bit PACC with 1019-bit blocks, three bits (e.g., {101}) must be added to the 127 byte frequency-conditioned plaintext block before encrypting the frequency-conditioned plaintext in order to have 1019 elements. For general purpose parity-balanced data, one bit is preferably added. Depending on the specific implementation, this bit may be either padding or an additional data bit.

Although the above-described examples employ a block cipher technique, frequency-conditioning data in accordance with the teachings herein is not limited to use in block ciphers. Other encryption techniques such as stream cipher techniques, may be used. For example, blocks may be of any arbitrary size, including the full length of the plaintext P 19, and the output of a CSPRNG may be XORed with a frequency-conditioned block of data in a manner consistent with the teachings herein.

After block encoder/processor 18 converts P 19 into a frequency-conditioned format and appropriately pads each block, key manager 20 may use output from block encoder/processor 18 to determine a length of the key sequence, such that each block may be encrypted with a unique key of the appropriate length. Said key sequence can be obtained by establishing a new DHK 1, via a secure channel or, alternatively, by expanding the current key using various stages of key establishment. In a preferred embodiment, the key sequence for additional blocks can be derived from a frequency-conditioned seed encrypted within a block of data. This seed may then be used in conjunction with a CSPRNG, in a manner similar to that described above and with reference to FIG. 1.

In an example that includes 1019-bit blocks of data with the 8-bit PACC shown in Table 2, the first block may simply contain:

{{560 bits explicit PACC assignments}, {459 bits CSPRNG seed}}.

Subsequent blocks may then contain the plaintext message which has been encoded by block encoder/processor 18 with the designated PACC assignments and shuffled by the output of a CSPRNG initialized using the specified seed.

Generally, any block may substantially take the form of a collection of one or more substrings, such as in the example below:

$$\{\{v\},\{w\},\{x\},\{y\},\{z\}\}$$

where the substrings
v=control or instruction character(s) (e.g., "ALT")
w=specification of charter-to-code mappings
x=CSPRNG seed
y=data
z=padding
may appear in a suitably arranged order and in multiple instances. One skilled in the art will recognize that data blocks may contain other suitable substrings, as well.

Moreover, it is possible to generate new key material in numerous ways consistent with the teachings herein. Beginning with E 17, key manager 20 generates key sequence K 21. For a one block message, K will be equal to E (K=E). The binary data B 22 is encrypted by array processor 23 using K 21 in the following manner.

For each block, an array Q is generated by attaching each element of K 21 to the corresponding bit $b_i$ in B 22. Using the first block as an example, $$Q=\{\{b_1,K_1\},\{b_2,K_2\},\ldots,\{b_{1019},K_{1019}\}\}.$$

Sorting Q on K 21 shuffles B 22 which, when extracted, yields ciphertext C 24. If F is the bijective function that applies K 21 to B 22, then F(B)=C.

Figure 4:
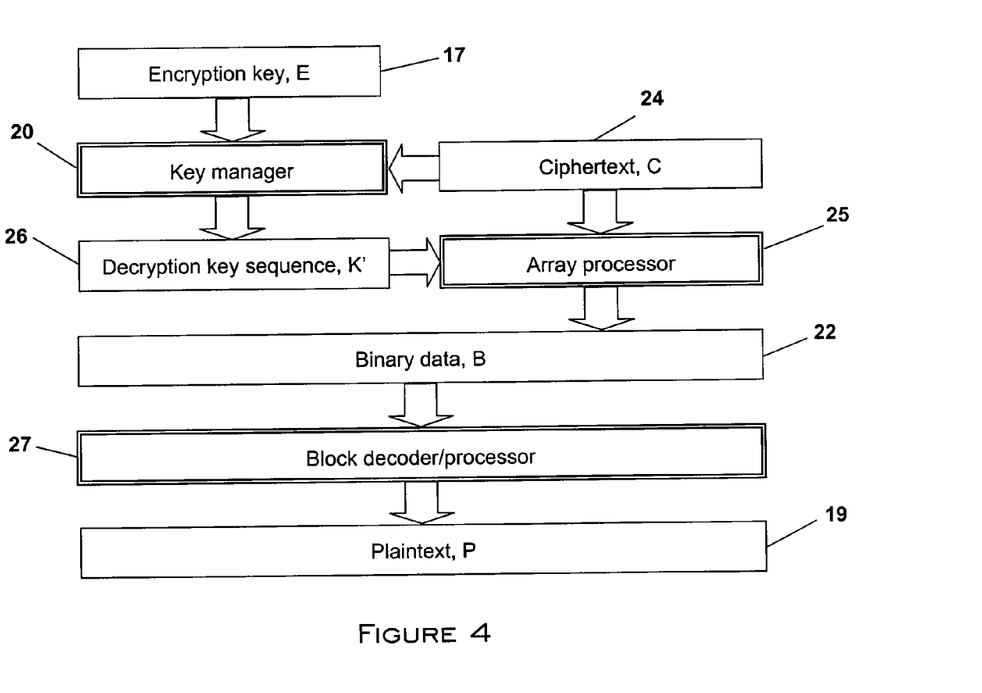
FIG. 4 illustrates the decryption of data.

Referring to FIG. 4, to decrypt C 24, an array, R, is generated by array processor 25 which associates an index value with each element of K 21:

$$R=\{\{1,K_1\},\{2,K_2\},\ldots,\{1019,K_{1019}\}\}.$$

Sorting R on K and extracting the shuffled indices produces the decryption key sequence, K' 26.

Thereafter, an array, Q', is generated by attaching each element of K' to the corresponding bit $c_i$ in C 24:

$$Q'=\{\{c_1,K'_1\},\{c_2,K'_2\},\ldots\{c_{1019},K'_{1019}\}\}.$$

Sorting Q' on K' unshuffles C 24 which, when extracted, yields B 22. If $F^{-1}$ is the inverse function that applies the decryption key K' to C, then $F^{-1}(C)=B$.

Once B 22 is retrieved, block decoder/processor 27 strips any post data padding, and converts the remaining binary code is to plaintext P 19 consistent with the chosen method of data conditioning.

Although the present application has been described in relation to particular embodiments thereof, many other variations and modifications and other uses will become apparent to those skilled in the art. It is preferred, therefore, that the present application be limited not by the specific disclosure herein, but only by the appended claims.

What is claimed:

1. A system for data encryption, the system comprising:
at least one computing device having instructions that, when executed by a data processor device, cause the at least one computing device:
to receive at least one block of the data comprising k unique data elements; to modify the at least one block of data to cause each of the k unique data elements within the at least one block to appear with a respective predetermined frequency ratio substantially equal to 1/k;
wherein the modification of the at least one block of data is performed according to a character code representing alphanumeric characters, such that each character is represented in the character code by a plurality of the unique data elements; and
to encrypt the block of data into ciphertext based at least on an encryption key.

2. The system of claim 1, wherein the at least one computing device has further instructions that, when executed, cause the at least one computing device to generate the encryption key.

3. The system of claim 1, wherein the at least one computing device has further instructions that, when executed, cause the at least one computing device to receive the encryption key.

4. The system of claim 1, wherein the encryption key is generated based at least on a key exchange algorithm.

5. The system of claim 1, further comprising a decrypter configured to decrypt the block of ciphertext and to modify the decrypted ciphertext so that each unique data element of the decrypted ciphertext appears in the unique data element's ratio prior to being modified to appear with the respective predetermined frequency ratio.

6. The system of claim 1, wherein the at least one block of data comprises a plurality of blocks of data, and further wherein the encryption key is different for at least one of the plurality of blocks of data.

7. The system of claim 6, wherein the at least one computing device has further instructions that, when executed, cause the at least one computing device to derive the different encryption key from a respective one of the plurality of blocks of data.

8. The system of claim 1, wherein at least one of the at least one block of data has a length equal to a prime number.

9. The system of claim 1, wherein each of the at least one block of data has a respective variable length.

10. The system of claim 1, wherein the modifying the at least one block comprises causing a plurality of data elements to appear with respective predetermined frequency ratios, and further wherein each of the respective predetermined frequency ratios is substantially equal.

11. The system of claim 1, wherein the at least one computing device further receives instructions that, when executed, cause the at least one computing device to modify a character code associated with the data,
wherein the respective predetermined frequency ratio is achieved by at least using the modified character code.

12. The system of claim 11, wherein the at least one computing device has further instructions that, when executed, cause the at least one computing device to receive the modified character code.

13. The system of claim 11, wherein the modified character code includes a plurality of characters that contain a substantially same distribution of elements.

14. The system of claim 11, wherein at least one of the at least one block of data contains one other modified character code.

15. The system of claim 1, wherein the at least one computing device has further instructions that, when executed, cause the at least one computing device to pad each of the at least one block of data, wherein the respective predetermined frequency ratio is achieved at least using the padding.

16. The system of claim 1, wherein the at least one computing device has further instructions that, when executed, cause the at least one computing device to rearrange positions of data elements in each of the at least one block of data, and further wherein the encrypting comprises the rearranging.

17. The system of claim 1, wherein the at least one computing device has further instructions that, when executed, cause the at least one computing device to modify the encryption key based on at least one inherent property of the encryption key, wherein the at least one inherent property comprises one or more of a number theoretic characteristic, an element value, and a key length.

18. A method for encrypting data, the method comprising:
constructing at least one character code representing characters, such that each character is represented in the at least one character code by a plurality of unique data elements, and each character includes a first unique data element having substantially a same frequency distribution in the character as every remaining unique data element of the plurality of unique data elements;
storing the at least one character code on at least one computing device;
encoding the data, by the at least one computing device, according to the stored at least one character code to generate encoded data; and
encrypting the encoded data into ciphertext by the at least one computing device, based at least on one encryption key.

19. The method of claim 18, wherein the encrypting includes rearranging the encoded data.

20. A method for data encryption by a computing device comprising a data processor, the method comprising:
receiving, by at least one computing device, at least one block of the data comprising k unique data elements;
modifying, by the at least one computing device, the at least one block of data to cause each of the k unique data elements within the at least one block to appear with a respective predetermined frequency ratio substantially equal to 1/k;
wherein the modification of the at least one block of data is performed according to a character code representing alphanumeric characters, such that each character is represented in the character code by a plurality of the unique data elements; and encrypting, by the at least one computing device, the block of data into ciphertext based at least on an encryption key.

21. The system of claim 1, wherein each unique data element is a bit and k=2.

* * * * *